(12) United States Patent
Lee et al.

(10) Patent No.: US 6,678,404 B1
(45) Date of Patent: Jan. 13, 2004

(54) AUTOMATIC REFERENCING FOR COMPUTER VISION APPLICATIONS

(76) Inventors: Shih-Jong J. Lee, 15418 SE. 53rd Pl., Bellevue, WA (US) 98006; Seho Oh, 5229 107th St. SW, Mukilteo, WA (US) 98275

( * ) Notice: Subject to any disclaimer, the term of this patent is extended or adjusted under 35 U.S.C. 154(b) by 161 days.

(21) Appl. No.: 09/703,018

(22) Filed: Oct. 31, 2000

(51) Int. Cl.$^7$ ................................................ G06K 9/00
(52) U.S. Cl. ...................... 382/155; 382/143; 382/145
(58) Field of Search ..................... 382/141, 143–151, 382/155, 156, 157, 217, 294, 296; 348/87, 125, 126, 92; 706/52; 700/47, 48

(56) References Cited

U.S. PATENT DOCUMENTS

| | | | | |
|---|---|---|---|---|
| 5,046,111 A | * | 9/1991 | Cox et al. | 382/143 |
| 5,229,868 A | * | 7/1993 | Kanno et al. | 358/447 |
| 5,842,194 A | * | 11/1998 | Arbuckle | 706/52 |
| 5,850,466 A | * | 12/1998 | Schott | 382/141 |

OTHER PUBLICATIONS

C.H. Anderson, C.R. Carlson, R.W. Kolpfenstein, "Spatial–frequency Representations of Images with Scale Invariant Properties", SPIE vol 360:90–95.

Peter J. Burt, "Fast Algorithms for Estimating Local Image Properties", Computer Vision, Graphics and Image Processing, vol. 21: 368–382, 1983.

E.H. Adelson, C.H. Anderson, J.R. Bergen, P.J. Burt, J.M. Ogden, "Pyramid Methods in Image Processing", RCA Engineer 29–6, Nov./Dec. 1984.

Ballard DH and Brown CM, "Normalized Correlation", Computer Vision, Prentice–Hall Inc., 1982.

Burt, PJ, "Fast Filter Transforms for Image Processing", Comp. Graphics and Image Processing, 16:20–51, 1981.

Burt PJ and Adelson E, "The Laplacian Pyramid as a Compact Image Code" IEEE Trans. on Communication, vol. 31: 532–540, 1983.

Lee JSJ, Haralick RM and Shapiro LG, "Morphologic Edge Detection", IEEE Trans. on Communication, Vol; 31: 532–540, 1983.

Maragos P, "Pattern Spectrum and Multiscale Shape Representation", IEEE Trans on Pattern Analysis and Machine Intelligence, vol. 11, 7–12:701–716, 1989.

P.J. Burt, "The Pyramid as a Structure for Efficient Computation", New York: Springer–Verlag, 1984.

James L. Crowley and Arthur C. Sanderson, "Multiple Resolution Representation and Probabilistic Matching of 2D Gray Scale Shape", IEEE:95–105, 1984.

Sternberg SR, "Grayscale Morphology", Computer Vision, Graphics, and Image Processing, Vol 35:333–355, 1986.

* cited by examiner

*Primary Examiner*—Samir Ahmed
*Assistant Examiner*—Vikkram Bali (57) ABSTRACT

A method for creating and using reference images in a defect detection or location system which receives a plurality of learning images containing objects of interest and creates at least one reference image output. Using the reference image, the computer vision system detects discrepancies between objects of interest in an input image and the expected object from the reference images. The defect detection system generates a discrepancy image output. The computer vision system further determines the existence of the object of interest in an input image and provides the object of interest location if detected.

4 Claims, 12 Drawing Sheets

AUTOMATIC REFERENCING FOR COMPUTER VISION APPLICATIONS

U.S. PATENT REFERENCES

1. U.S. Pat. No. 5,315,700 entitled, "Method and Apparatus for Rapidly Processing Data Sequences", by Johnston et. al., May 24, 1994
2. U.S. Pat. No. 6,130,967 entitled, "Method and Apparatus for a Reduced Instruction Set Architecture for Multidimensional Image Processing", by Shih-Jong J. Lee, et. al., Oct. 10, 2000
3. Pending application Ser. No. 08/888,116 entitled, "Method and Apparatus for Semiconductor Wafer and LCD Inspection Using Multidimensional Image Decomposition and Synthesis", by Shih-Jong J. Lee, et. al., filed Jul. 3, 1997
4. U.S. Pat. No. 6,122,397 entitled, "Method and Apparatus for Maskless Semiconductor and Liquid Crystal Display Inspection", by Shih-Jong J. Lee, et. al., Sep. 19, 2000
5. Pending application Ser. No. 08/888,119 entitled, "Method and Apparatus for Incremental Concurrent Learning in Automatic Semiconductor Wafer and Liquid Crystal Display Defect Classification", by Shih-Jong J. Lee et. al., filed Jul. 3, 1997

REFERENCES

1. C. H. Anderson, C. R. Carlson, R. W. Kolpfenstein, "Spatial-frequency representations of images with scale invariant properties," SPIE vol. 360: 90–95.
2. Peter J. Burt, "Fast Algorithms for Estimating Local Image Properties," Computer Vision, Graphics, and Image Processing, vol. 21: 368–382, 1983
3. E. H. Adelson, C. H. Anderson, J. R. Bergen, P. J. Burt, J. M. Ogden, "Pyramid methods in image processing," RCA Engineer 29-6, November/December 1984.
4. Ballard D H and Brown C M, "Normalized Correlation," Computer Vision, Prentice-Hall Inc., 1982.
5. Burt, P J, "Fast filter transforms for image processing," Comp. Graphics and Image Processing, 16: 20–51, 1981.
6. Burt, P J and Adelson, E, "The Laplacian pyramid as a compact image code," IEEE Trans. on Communication, vol. 31: 532–540, 1983.
7. Lee, J S J, Haralick, R M and Shapiro, L G, "Morphologic Edge Detection," IEEE Journal of Robotics and Automation RA-3 No. 2: 142–156, 1987.
8. Maragos, P, "Pattern Spectrum and Multiscale Shape Representation," IEEE Trans. on Pattern Analysis and Machine Intelligence, vol. 11, 7–12: 701–716, 1989
9. P. J. Burt, "The Pyramid as a Structure for Efficient Computation," New York: Springer-Verlag, 1984.
10. James L. Crowley and Arthur C. Sanderson, "Multiple Resolution Representation and Probabilistic Matching of 2D Gray Scale Shape," IEEE: 95–105, 1984.
11. Sternberg, S R, "Grayscale morphology," Computer vision, Graphics, and Image Processing, vol. 35: 333–355, 1986.

Co-Pending U.S. Patent Applications Incorporated by Reference into this Application 1. Co-pending U.S. Patent application entitled, "Image Processing System with Enhanced Memory Management", by Shih-Jong J. Lee et. al. filed Oct. 20, 2000

TECHNICAL FIELD

This invention relates to object detection and location using automatic referencing in a computer vision system.

BACKGROUND OF THE INVENTION

Many computer vision applications allow the user to specify an object of interest template (i.e. a type of reference image) and use the template to match new images for object of interest detection and/or location. This simple approach is the basis for many useful machine vision tools in object finding, location, alignment and measurements. To detect objects of interest, a correlation method is applied to compare the grayscale values of the images and the object template (Reference 4, Computer Vision p.66–68). The position having the highest correlation value is the detected object location. This approach works well when the objects of interest exhibit little difference from the template. However, it cannot accurately locate objects that change in orientation or scale from the template. It also performs poorly when subjected to illumination changes, production variations, and partial occlusion.

To circumvent these limitations, prior art uses normalization methods such as normalized grayscale correlation (Reference 4, Computer Vision p.66–68) to increase the robustness of the template matching approach in the presence of large background variations. However, these methods yield many false alarms. To overcome this difficulty, a geometric information approach is used in place of grayscale correlation (http://www.cognex.com/marketing/products/prod_8000_patmax.asp reference: PatMax). Examples of the geometric approach would be to encode a square as four line segments and a football as two arcs and measures characteristics such as shape, dimensions, angle, arcs, and shading. The geometric information from both the features and spatial relationships are used to detect objects of interest without regard to the object's orientation, size or appearance. Unfortunately, this approach depends on reliable identification and isolation of key geometric features within an image. It fails on objects with ambiguous or difficult to detect geometric features. Moreover, many false alarms occur when detection sensitivity is set to detect ambiguous objects at reasonable capture rates. Again, the difficulty is with objects having substantial differences from the template such as a large orientation difference from the template or having partial occlusion, scale changes, etc. Another difficulty is the problem of automating this approach, since prior art methods frequently rely on a trial and error manual programming. Finally, in the prior art it is difficult to know during the design process, all the variables that the system will actually encounter during use and assure that the full application range has been represented.

OBJECTS AND ADVANTAGES

This invention seeks to improve the conventional object matching approach such as the correlation method or geometric information method already known to those skilled in the art. Instead of relying on a single or a few templates specified by users, it is an object of this invention to automatically extract useful information from real application images that represent the objects of interest as well as their expected variations in the application specific domain. This systematic automatic approach produces data that better represents the application.

It is an object of this invention to improve efficiency and effectiveness by changing methods used to represent templates. The invention enhances detection and location efficiency and signal to noise ratio by representing templates as multi-resolution image data. Multi-resolution image representation facilitates a coarse to fine template matching approach and distributes image variations into different spatial-frequency bands, allowing specific weighting and discrimination filtering. Systematic adjustment of system parameters such as orientation, gain and offset, and noise level for effective matching can be done more rapidly or more effectively with multi-resolution image data.

SUMMARY OF THE INVENTION

In an embodiment, the invention includes an automatic reference based defect detection system having an automatic reference image generation module. The embodiment further comprises means for generating a mean reference image and a deviation reference image. Means are further provided for thresholding and normalizing a discrepancy image.

In an embodiment, the invention includes an automatic reference based object location system.

In an embodiment the invention includes an automatic reference image generation system.

In an embodiment, the reference images include a mean image and a deviation image. The mean image is an automatically derived representation of the template image under a specified "ideal" situation. The deviation image is an automatically derived representation of the expected variations on different portions of any template image. In an embodiment, the invention heightens the weights of object regions with low variations and lowers the weights of object regions with high variations in an object detection process. Using this weighting, the reference mean image enhances the detection signal of the object of interest and the reference deviation image decreases the effects of noise.

In an embodiment, the reference images are represented in a multi-resolution image space.

DETAILED DESCRIPTION OF THE INVENTION

Object Detection System Using Automatic Referencing

Figure 1:
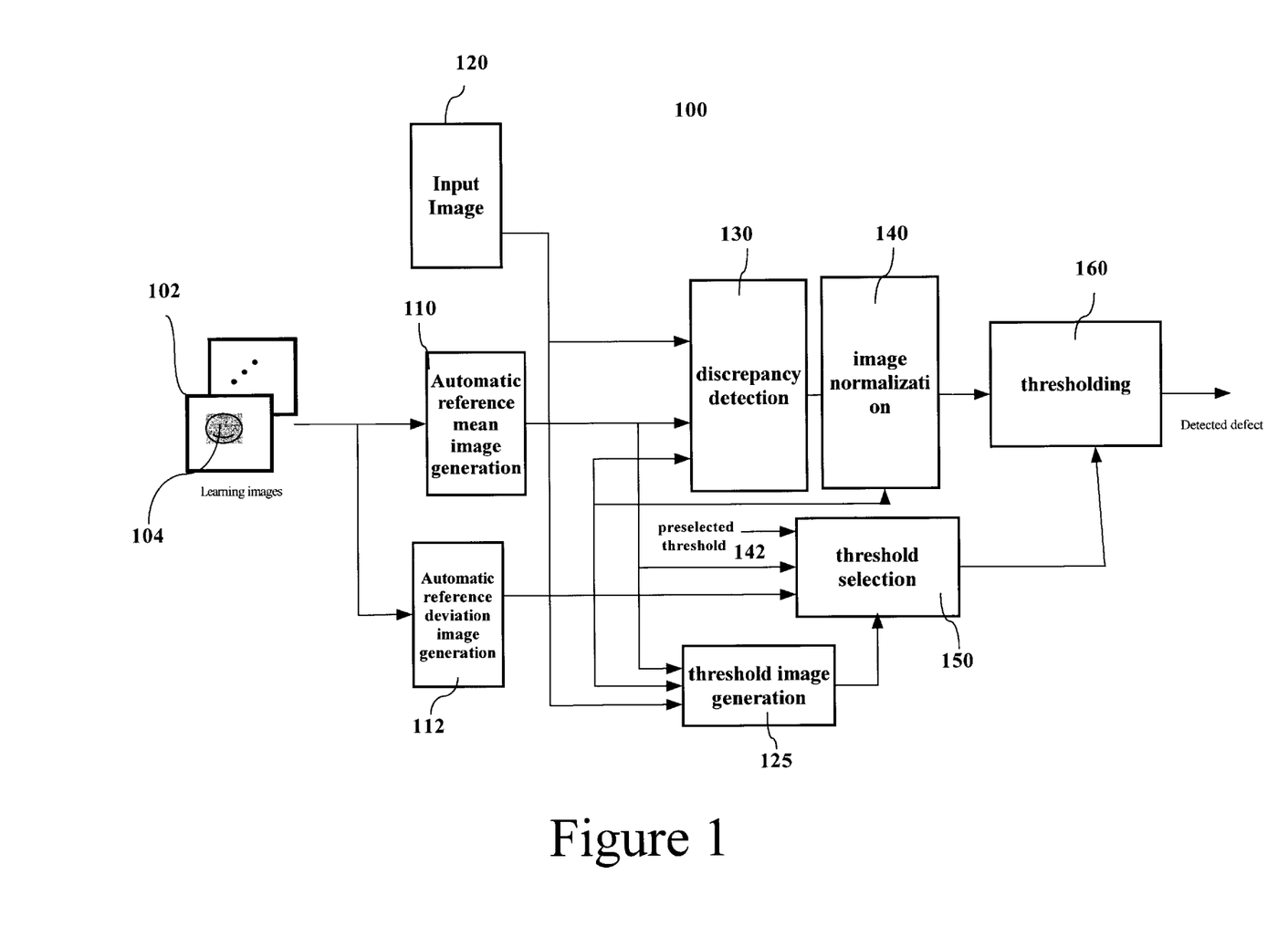
FIG. 1 shows an automatic referencing based defect detection system
Figure 2:
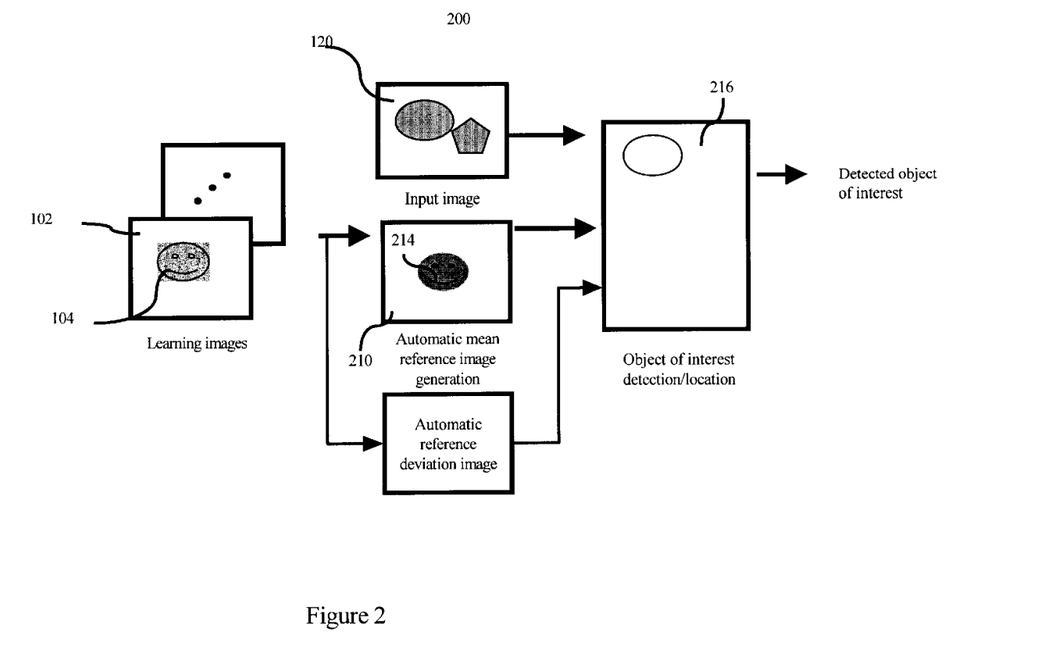
FIG. 2 shows an automatic referencing based object location system

FIG. 1 and FIG. 2 show the processing flows for two application scenarios of the invention. FIG. 1 shows an automatic referencing based defect detection system 100 and FIG. 2 shows an automatic referencing based object location system 200.

In the automatic referencing based defect detection system 100, at least one automatic reference image 110 is generated from a plurality of learning images 102 containing objects of interest 104. During applications, the discrepancy between an object in the input image 120 and the expected object of interest from the reference image 110 is detected 130 and the discrepancy can be normalized 140 by the reference deviation image. The normalized discrepancy image is thresholded 160 to detect defects. The threshold can be done by a pre-selected threshold value 142 or by an automatically determined threshold value from the reference image or from a combination of the reference and the input image. The thresholding 150 can also be done by a threshold image 125 that is automatically determined from the reference image or from a combination of the reference and the input image.

In the automatic referencing based object location system 200 shown in FIG. 2, at least one automatic reference image 210 is generated from a plurality of learning images 102 containing objects of interest 104. The objects in the input image are compared to the expected object of interest 214 from the reference image to detect the object of interest and determine their location 216. The comparison can be done using a correlation method normalized by the reference image or a reference deviation image. To handle scaling and viewing angle changes, a multi-resolution approach can be used to yield accurate and efficient results (See FIG. 12).

Automatic Reference Image Generation Processing Flow

Figure 3:
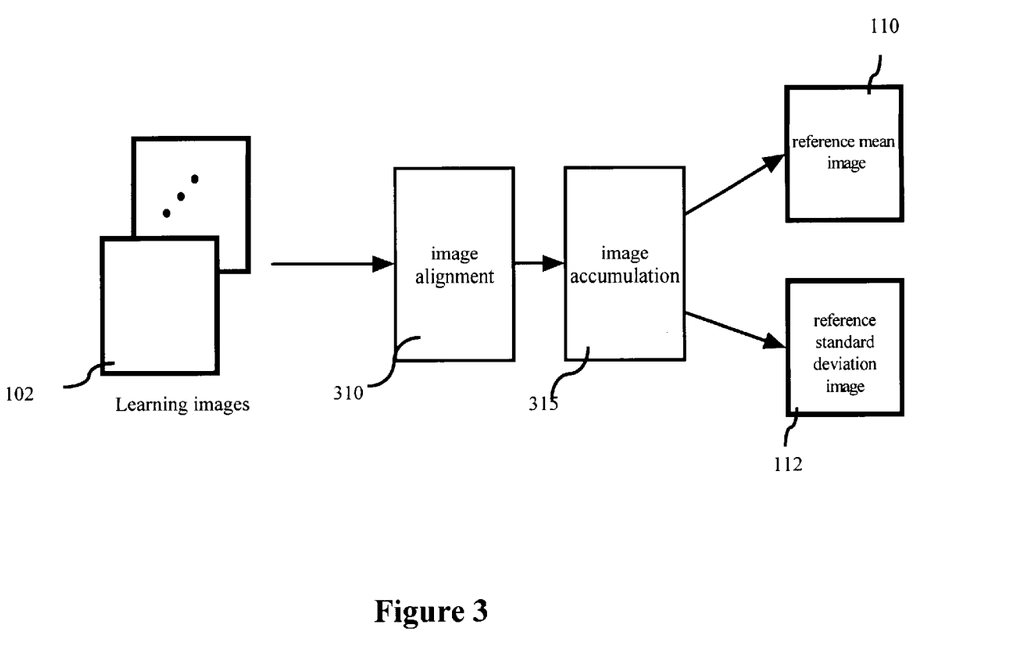
FIG. 3 shows the processing flow for automatic reference image generation

The processing flow of the automatic reference image generation of this invention is shown in FIG. 3. The learning images 102 are aligned 310 and accumulated 315. The alignment consists of registering the images one with respect to another, so that the statistics of an individual pixel will not be too influenced by variabilities in image registration. Accumulation is done as part of acquiring a mean value for every pixel in the reference image. A reference mean image 110 and a reference deviation image 112 are derived from the accumulated images. The learning images can be pre-processed 410, FIG. 4, to enhance the features of interest and/or normalize out global bias before the alignment 310 and accumulation 315 is applied. The accumulation and reference derivation can be done using multi-resolution approaches as shown in FIG. 5A and FIG. 5B. A multi-resolution approach 500 performs alignment 510, 512 and accumulation 515, 517 in multiple resolutions and creates full resolution reference images by image reconstruction. An alternative multi-resolution approach 550 performs alignment and accumulation 560 in full resolution and creates multi-resolution reference images 570, 580 by multi-resolution image generation.

Learning Image Acquisition

Figure 6:
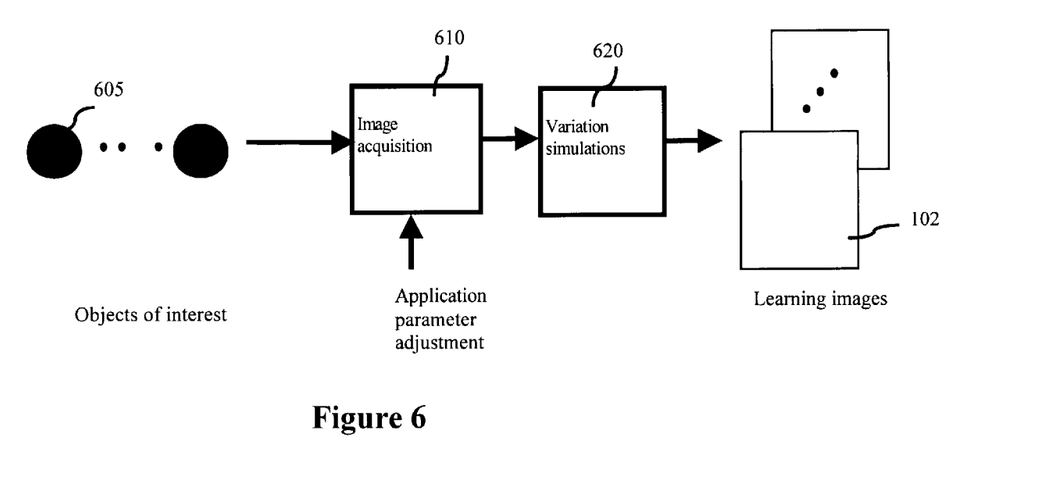
FIG. 6 shows a learning image acquisition process

The learning image acquisition process is shown in FIG. 6. Reference images are generated from a plurality of learning images 102. The learning images are images of objects of interest under representative application variations. The number of images required for a good learning outcome depends on the amount of variation within the application. More images are required for applications having large variability. For applications having little variability, only a few images are required.

The learning images can be selected and supplied by users or can be automatically acquired from images of the real application. In one embodiment of the invention, users supply learning images during start up of the application. The learning images are instances of object(s) of interest 605 acquired under representative application variation 610. To reduce the number of learning images required, users could systematically adjust application parameters such as illumination, orientations, etc. and acquire images under the systematically changing application conditions. Users could specify expected ranges of application variation and additional learning images can be generated by computer simulation 620. For example, adjusting the gain and offset of the image intensity values can simulate changes in illumination condition; blurring or de-blurring the images by image processing can simulate changes in focus.

Figure 7:
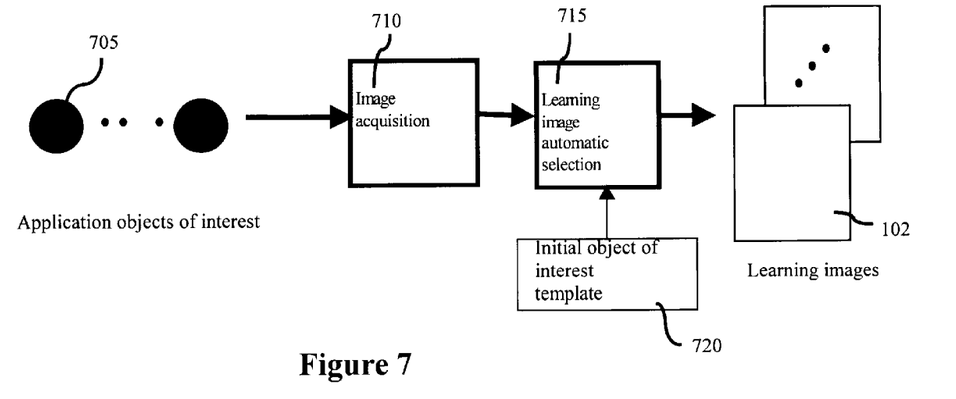
FIG. 7 shows an automatic learning image acquisition process

Learning images can also be automatically acquired from application images as shown in FIG. 7. Application images are acquired 710 and learning images are automatically selected 715 from the application images 710. The learning image automatic selection process 715 detects the objects of interest 705 from the application images 710 using the initial object of interest template 720 supplied by users. In one embodiment of the invention, the detection is done by the correlation method. After correlation, it evaluates the goodness of the correlation for the detected object of interest. Only the objects of interest with a reasonable match to the initial object of interest are selected for learning to assure the quality of the learning images. This is done by setting an acceptance limit for the minimum amount of correlation.

Pre-processing

Figure 4:
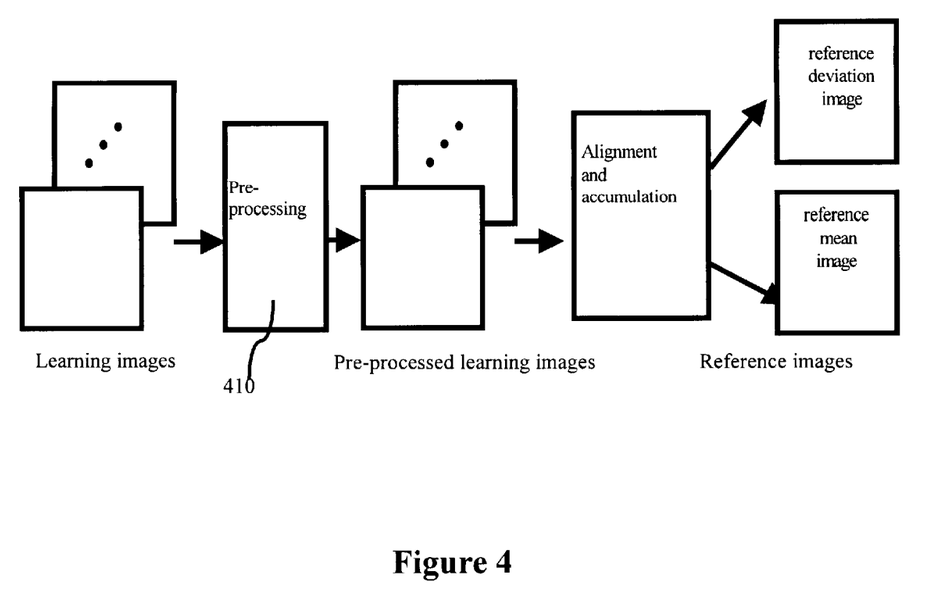
FIG. 4 shows the processing flow for automatic reference image generation including a pre-processing step
Figure 5A:
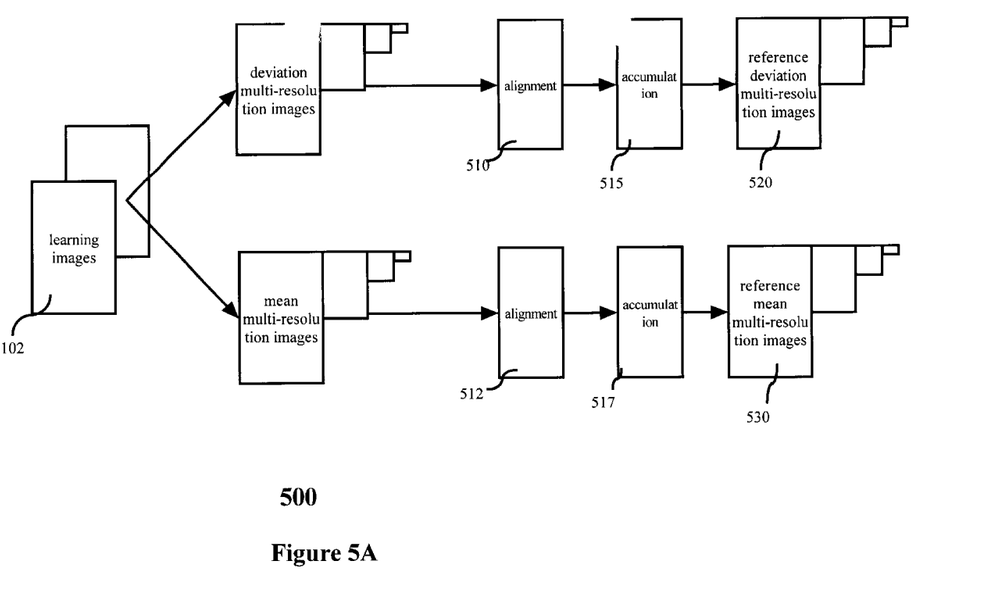
FIGS. 5A and 5B show the processing flow for two automatic multi-resolution reference image generation
Figure 5B:
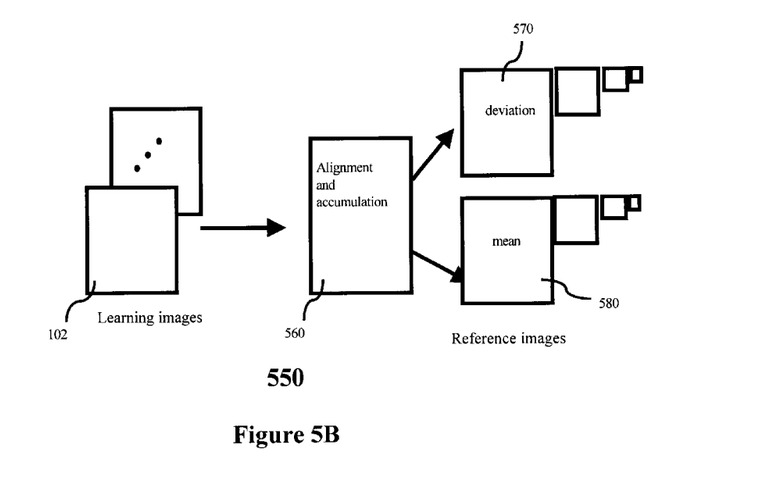

The learning images can be pre-processed 410, in FIG. 4, before the alignment and accumulation processes. The pre-processing stage enhances the object features of interest and removes irrelevant or unreliable information. In one embodiment of the invention, contrast normalization is performed to the learning images for pre-processing. Contrast normalization can be conducted by defining a desired image intensity histogram. The histogram of the input image is measured and compared to the desired histogram. Image intensity values are re-quantized and re-mapped to approximate the desired image intensity histogram. In another embodiment of the invention, a simpler contrast normalization method is conducted by a gain and offset adjustment as follows:

$$I\_normalized = I\_input * Gain + Offset$$

The gain can be determined by $$Gain = Desired\_range / (I\_max - I\_min)$$

Where "Desired_range" is the desired range for the image intensity histogram and "I_max"" and "I_min" are the estimated maximum and minimum intensity values from the input image. The estimation can be based on the measured value or using robust statistical methods to avoid outlier difficulties.

The offset value can be determined by $$Offset = MIN\_value - I\_min$$

Where "MIN_value" is the desired minimum value of the image intensity.

Another pre-processing step in one embodiment of the invention is edge enhancement. Many edge enhancement methods can be used such as the morphological edge detection method by Lee et al ( Reference 7: "Lee, J S J, Haralick, R M and Shapiro, L G, "Morphologic Edge Detection", *IEEE Trans. Robotics and Automation* RA3(2): 142–56, 1987."). Other feature enhancement methods such as high-pass filtering, band-pass filtering or selectively enhancement such as line detection or corner detection can be used for pre-processing. By way of example, line detection or corner detection operators can highlight lines or corner features of an image.

In applications such as semiconductor wafer inspection, repeated wafer patterns may not provide relevant information for defect inspection. Application-specific pre-processing methods can be used to remove the irrelevant information. As an example, the preprocessing step removes the repeated patterns using a cell-to-cell, die-to-die or shot-to-shot correlation approach. As another example, the pre-processing step enhances the repeated pattern by averaging over the adjacent repeated patterns and subtracts the enhanced repeated pattern from the image to remove the repeated pattern.

Alignment

The alignment step determines the relative position and/or orientation of the object(s) of interest in the input image with respect to the reference coordinate in the object of interest template. In one embodiment of the invention, the orientation and position of the input image are determined by a detection method. In the detection method, at least one fiducial mark is used for the orientation alignment. A fiducial mark can be as simple as two points or can consist of more complicated patterns such as cross, circle, square, triangle, etc. The fiducial marks can be specified by users or can be automatically determined. For machine parts having CAD/CAM models available, fiducial marks can be automatically selected from the models. The selection process selects marks (including features) from different sides of the object center and far away from each other to increase the precision of the alignment measurement.

Figure 8:
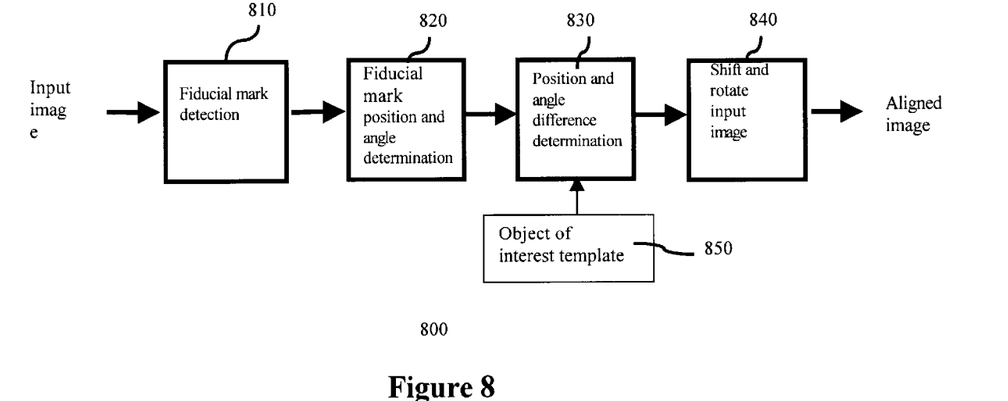
FIG. 8 shows the processing flow for the detection based alignment process

The processing flow of the detection based alignment process is shown in FIG. 8. In one embodiment of the invention 800, the alignment step detects the fiducial marks 810 and determines their locations. The line connecting the centers of the fiducial marks is derived and its orientation determined. The difference between the detected orientation and the expected orientation from the object of interest template is determined 830. Similarly, the difference between the average center locations of the fiducial marks measured from the input image and the expected center location is compared. The alignment step 840 rotates and shifts the input image to compensate for the orientation and position difference and thus creates an aligned image.

Figure 9:
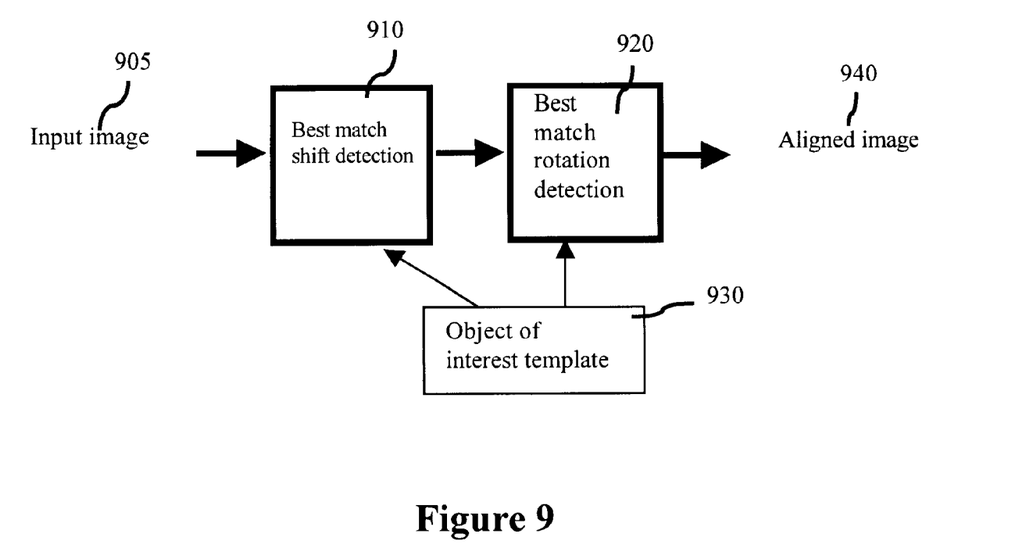
FIG. 9 shows the processing flow for the correlation based alignment process

An alternative embodiment of the invention uses a correlation method for alignment. The processing flow of the correlation based alignment process is shown in FIG. 9. The method first finds the best match of the object of interest template 930 and the objects in the input image 905 by shifting the input image and performing correlation operation 910. The image is then rotated and a correlation step is applied to find the best matched rotation angle 920. The shifted and rotated image that corresponds to the best match is the aligned image 940. This method is most useful for objects of interest where clearly detectable fiducial marks do not exist.

Figure 10:
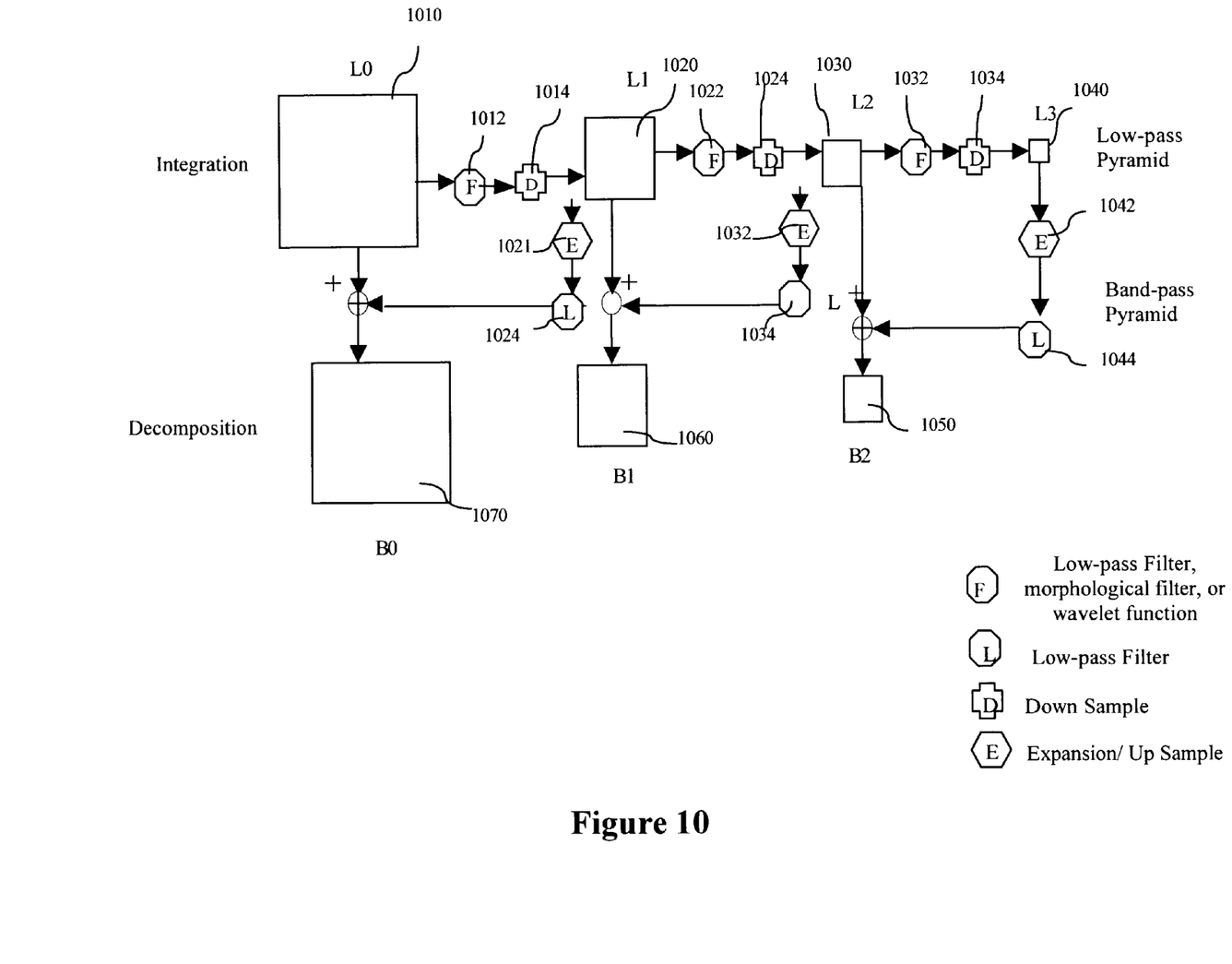
FIG. 10 shows the procedure to generate low-pass and band-pass pyramids

The alignment step can also be done using a multi-resolution approach. In one embodiment of the invention, the multi-resolution image representation includes a low-pass pyramid and a band-pass pyramid as shown in FIG. 10. The pyramid data structures isolate image features at different scales. The low-pass pyramid consists of copies of the original image where both sample density and resolution are decreased in regular or irregular steps. It is obtained through an iterative algorithm. The bottom, or zero-th level of the low-pass pyramid, L0, is equal to the original image. This image is (linearly, morphologically or by wavelet function) low-pass filtered and down-sampled (usually by a factor of two in each dimension) to obtain the next pyramid level, L1. L1 is then filtered in the same manner and down-sampled to obtain L2. Further repetitions of the filter/down-sample steps generate the remaining low-pass pyramid levels. Thus, $$L0=I;$$

$$Li=D(F(Li-1)), \text{ for } i>=1,$$

where I is the input image, F(.) is a low-pass filter operation, and D(.) is a down-sample operation. The low-pass filter can be a linear convolution filter, a nonlinear morphological filter such as dilation, erosion, opening, closing, [Serra, 1982, Sternberg, 1986, Lee et al., 1987, Acharya and Laurette, 1988] or a wavelet function. The low-pass pyramid is equivalent to filtering of the original image by a set of equivalent linear or nonlinear neighborhood kernels. The equivalent kernels increase in size (in proportion to down-sample factor) with each level. In one embodiment of the invention, F(.) is a linear Gaussian convolution with a five pixel kernel and a down-sample ratio is two in each dimension, the equivalent filters act as low-pass filters with band limit reduced correspondingly by one octave with each level. The linear low-pass decomposition using Gaussian kernels is equivalent to the well-known Gaussian pyramid data structure. [Burt, 1981, Burt and Adelson, 1983, references 5,6].

As an example, consider the bandpass decomposition B0. Subtracting the low-pass pyramid level L0 1010 from the next lower level L1 1020 in the pyramid generates the band-pass pyramid B0 1070. Because L0 1010 and L1 1020 levels differ in their sample density, it is necessary to interpolate new sample values between those in L1 before that level is subtracted from the adjacent level L0. The interpolation can be achieved by expansion/up sample 1021 followed by a linear low-pass filtering 1024. A similar process is followed to create B1 1060 or B2 1050. The levels of the band-pass pyramid, Bi, can thus be specified in terms of the low-pass pyramid levels as follows:

$$Bi=Li-L(\text{EXP}(Li+1)),$$

where L(.) is a linear low-pass filter and EXP(.) is an expansion/up sample operation.

Figure 12:
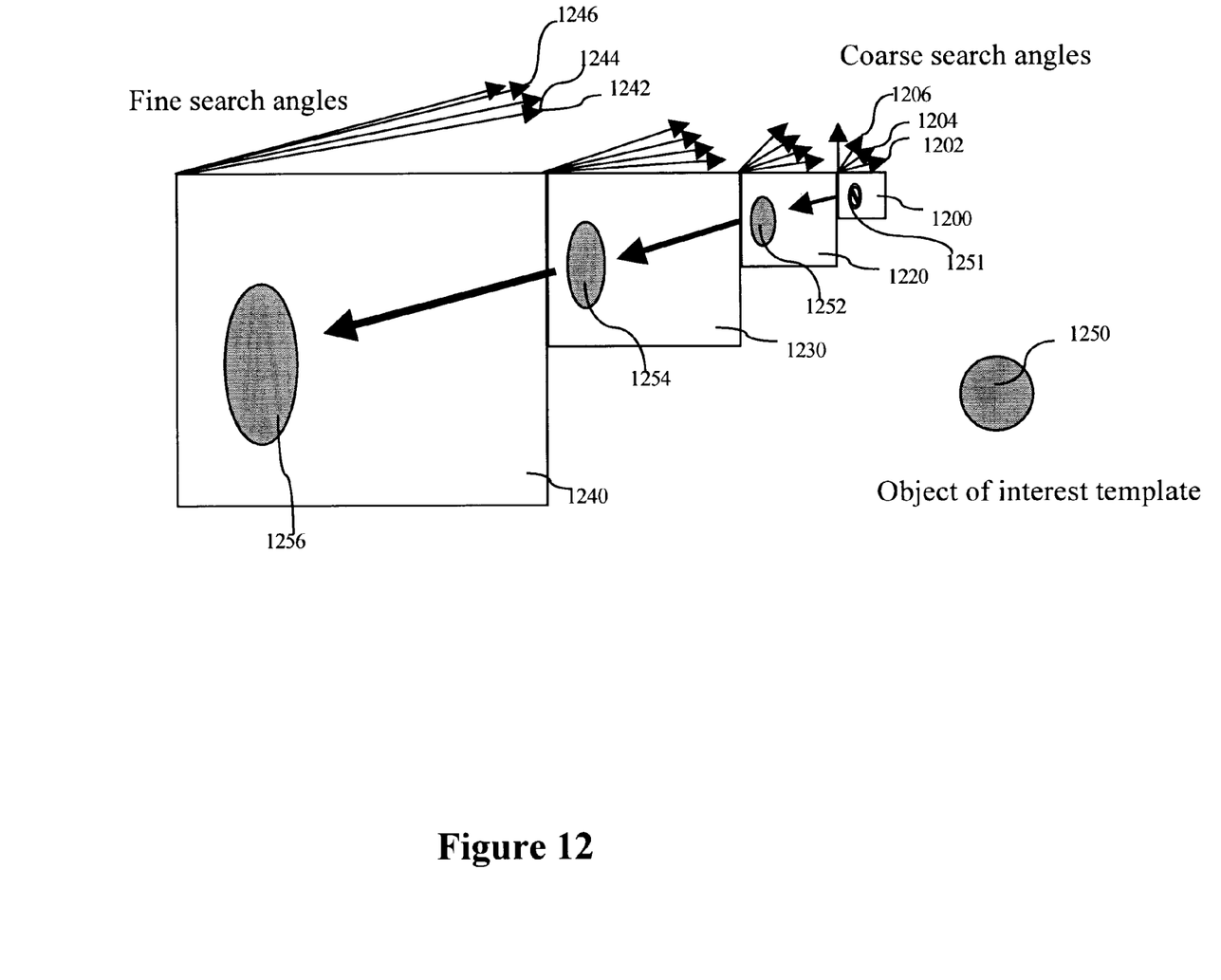
FIG. 12 shows the processing flow of a coarse to fine object location system using a multi-resolution approach.

The multi-resolution alignment process FIG. 12 generates a low-pass pyramid and a band-pass pyramid representation of the input image and performs alignment for each level of pyramid. In one embodiment of the invention, the alignment is performed from coarse resolution to fine resolution and uses the lowest resolution low-pass pyramid and the band-pass pyramid as the images for alignment (L3 1040, B2 1050, B1 1060 and B0 1070 for images in FIG. 10). In this embodiment of the invention, the alignment results from the coarse resolution can be used as starting point for the alignment process in the finer resolution. The multi-resolution approach generates a low-pass and a band-pass pyramid as shown in FIG. 10. It starts the comparison from the lowest resolution and uses lower resolution comparison results to guide higher resolution comparison. The comparison can be conducted using the low-pass pyramid (integrated energy) or the band-pass pyramid (spatial decomposition). For images with wide intensity dynamic range, each band-pass channel has restricted dynamic range for less expensive processing. Other parameters such as rotation angles can be included in the coarse to fine search. The processing flow is shown in FIG. 12 where an object of interest template 1250 is to be located. A multi-resolution input describes the image at 4 levels of resolution 1200, 1220, 1230, 1240 shown in FIG. 12 as larger size corresponding to higher resolution imagery. Low resolution image 1250 is searched through angles 1202, 1204, 1206 to locate the object of interest. This search covers a large area of the image because the low resolution creates relatively large search angles. If the object is located, an approximate position is used through a progression of higher resolution images and at each step of the process, the initial position of the object derived from the lower resolution image provides an efficient starting location. This process is very efficient and produces the most accurate result obtainable with the image 1240.

Accumulation

The aligned learning images are accumulated for the creation of reference images. In one embodiment of the invention, the accumulation is accomplished by incrementally updating a summation image, a sum of square image and an image count. The summation image I_sum is set to equal to the first aligned learning image and is subsequently updated for additional learning images by the following formula:

$$I\_sum(new)[i][j]=I\_sum(old)[i][j]+W*I\_input(aligned)[i][j]$$

Where "I_sum(new)[i][j]" is the ij-th pixel of the new (updated) value of the summation image, I_sum; "I_sum (new)[i][j]" is the ij-th pixel of the old summation image value and "I_input(aligned)[i][j]" is the ij-th pixel of the aligned input image. Adequate dynamic range (bits) should be allocated for each pixel of the I_sum image to assure the precision of the resulting image. W is a weighting factor that is normally set to 1. W can be adjusted dynamically over time or can be a function of the number of images that are learnede. W can also be determined based on the goodness of the learning image selection that can be derived from 715 in FIG. 7.

The sum of square image I_sos is set to equal to the squared image of the first aligned learning image and is subsequently updated for additional learning images by the following formula:

$$I\_sos(new)[i][j]=I\_sos(old)[i][j]+W*I\_input(aligned)[i][j]*I\_input(aligned)[i][j]$$

Where "I_sos(new)[i][j]" is the ij-th pixel of the new (updated) value of the sum of square image, I_sos; "I_sos (new)[i][j]" is the ij-th pixel of the old sum of square image value. Adequate dynamic range (bits) should be allocated for each pixel of the I_sos image to assure the precision of the resulting image.

The image count N is simply the weighted count of the number of learning images that are used for accumulation. It is set to 0 initially and is incremented by the weight W for each learning image.

The accumulation can be conducted in a multi-resolution approach. In one embodiment of this invention, we use the lowest resolution low-pass pyramid and the images in band-pass pyramid for image accumulation.

Due to the alignment process, the image pixels near the boundary of an image may not have valid values. The handling of the boundary condition is application dependent. In some applications, expected values are determined and used for those pixels. In other applications, the boundary pixels should be excluded from the accumulation process.

Reference Image Generation

A reference mean image can be generated from the summation image I_sum by a simple pixel by pixel division operation $$I\_mean = I\_sum/N$$

In one embodiment of the invention, the division is done though a look up table approach to save time. Use of look up tables is described in Co-pending U.S. patent application entitled, "Image Processing System with Enhanced Memory Management", by Shih-Jong J. Lee et. al. filed Oct. 20, 2000 which is incorporated by reference hereto.

A reference deviation image, Idev, can be generated from the sum of square image I_sos and I_mean by the following formula:

$$I\_dev[i][j] = SQRT(I\_sos[i][j]/N - I\_mean[i][j]*I\_mean[i][j])$$

Where SQRT is the square root function. In one embodiment of the invention, the division and the SQRT function are done though look up table operations to save time. Note that the reference images can include accumulation of other image statistics such as median image or maximum, minimum, maximum-minus-minimum and images with higher order statistics such skewness and kurtosis, etc.

All the reference images discussed above can be generated (or saved or used) in a multi-resolution approach. In one embodiment of the invention, reference images are generated at the highest image resolution and reference images for low-pass and band-pass pyramids are generated from the procedure as shown in FIG. 10. In an alternative embodiment of the invention, reference images are generated for the lowest resolution low-pass pyramid (L3 in this example) and the images in the band-pass pyramid (B2, B1, B0). Reference images for other levels of the low-pass pyramid can be generated by a multi-resolution image reconstruction approach. The multi-resolution image reconstruction method is shown in FIG. 11.

Figure 11:
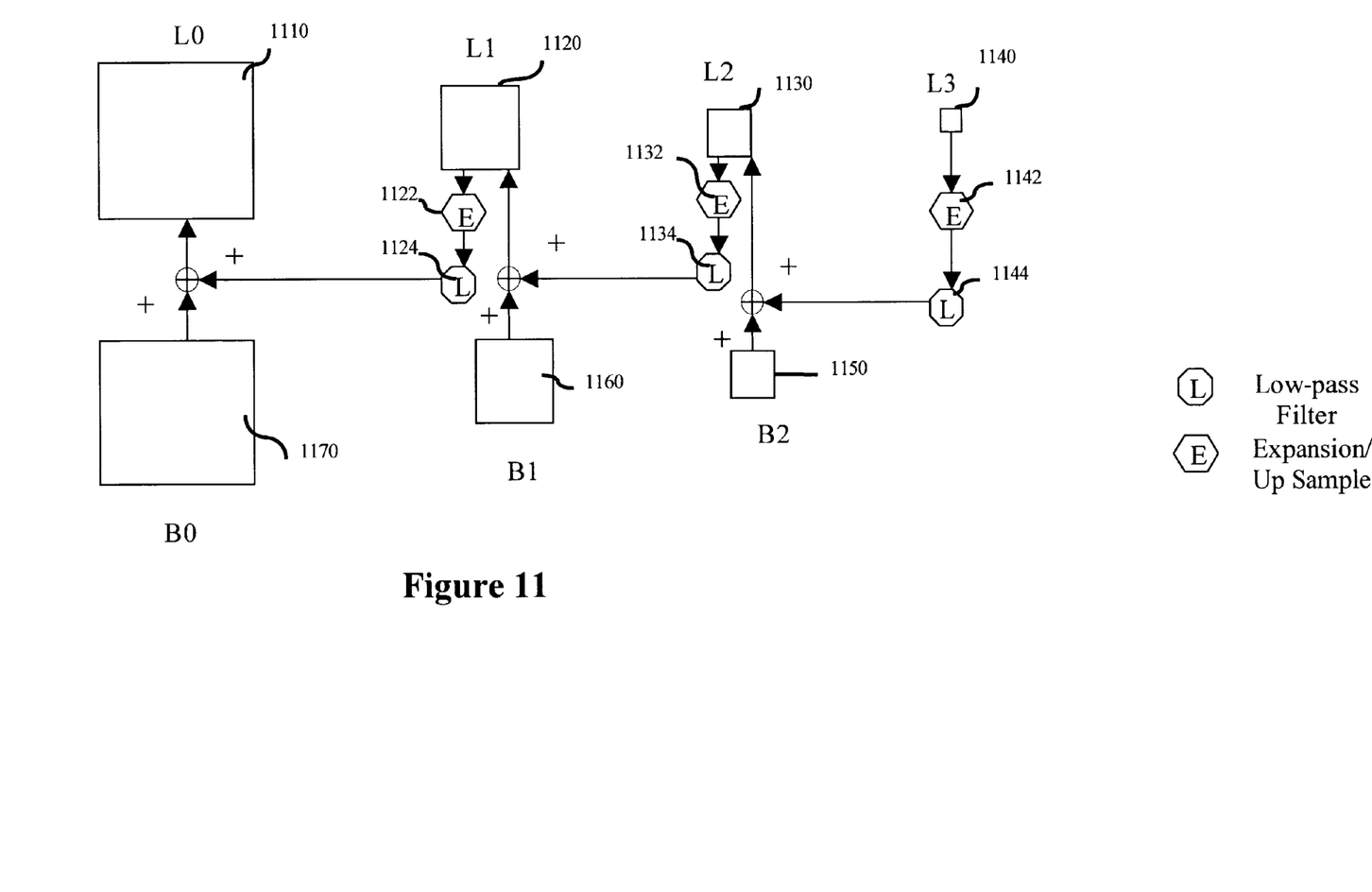
FIG. 11 shows Multi-Resolution image reconstruction from a pyramid representation

As shown in FIG. 11, the step used to construct the pyramids as shown in FIG. 10 can be reversed to reconstruct the original image. For I=2, to recover Li 1130, the low-pass pyramid level Li+1 1140 is interpolated 1142, 1144 and added to Bi 1150. This procedure can be repeated to recover Li−1 1120, Li−2 1110 which is the original image 1110. Thus, $$Li = Bi + L(EXP(Li+1)) \text{ for all } i \in \{1, \ldots, N-1\}, \text{ and}$$

$$I = L0 = B0 + L(EXP(L1)).$$

Reference Based Image Normalization for Object of Interest Location and Detection Reference images can be used to normalize the input image for object of interest detection. For correlation based object detection, the object of interest template in I_mean can be used for correlation. To reduce the contribution of the areas in the object of interest that exhibit high variations and thus are less reliable, in one embodiment of this invention the mean object of interest template is normalized by the deviation image as follows:

$$I\_OOI = I\_mean[i][j]/(\alpha + I\_dev[i][j]) \text{ where } \alpha \text{ is a fuzzy constant to control the amount of normalization}$$

To detect defects in the object of interest after the object of interest is located, the input image can be normalized by the following formula before a defect detection algorithm is applied:

$$I\_normalized = (I\_input - I\_mean)/(\beta + I\_dev[i][j]) \text{ where } \beta \text{ is a fuzzy constant to control the amount of normalization}$$

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. An automatic multi-resolution reference image generation method comprising:
   a. input a plurality of learning images;
   b. generate multi-resolution image representations of the plurality of learning images;
   c. perform alignment and accumulation of the plurality of learning images in multiple resolutions wherein the accumulation step accumulates a skewness statistic among pixels of the plurality of learning images;
   d. create reference images by multi-resolution image reconstruction.

2. An automatic multi-resolution reference image generation method comprising:
   a. input a plurality of learning images;
   b. generate multi-resolution image representations of the plurality of learning images;
   c. perform alignment and accumulation of the plurality of learning images in multiple resolutions wherein the accumulation step accumulates a kurtosis statistic among the pixels of the plurality of learning images;
   d. create reference images by multi-resolution image reconstruction.

3. An automatic multi-resolution based object location method comprising:
   a. input a plurality of learning images;
   b. perform alignment and accumulation of the plurality of learning images to generate a reference image output wherein the accumulation step accumulates a skewness statistic among the pixels of the plurality of learning images;
   c. create multi-resolution reference images by multi-resolution image generation using the reference image output;
   d. acquire an input image;
   e. perform multi-resolution based object location using the input image and the multi-resolution reference images.

4. An automatic multi-resolution based object location method comprising:
   a. input a plurality of learning images;
   b. perform alignment and accumulation of the plurality of learning images to generate a reference image output wherein the accumulation step accumulates a kurtosis statistic among the pixels of the plurality of learning images;
   c. create multi-resolution reference images by multi-resolution image generation using the reference image output;
   d. acquire an input image;
   e. perform multi-resolution based object location using the input image and the multi-resolution reference images.

* * * * *